(12) United States Patent
Schmidt et al.

(10) Patent No.: US 9,919,743 B2
(45) Date of Patent: Mar. 20, 2018

(54) FRONT END OF A MOTOR VEHICLE

(71) Applicant: FORD GLOBAL TECHNOLOGIES, LLC, Dearborn, MI (US)

(72) Inventors: Marcel Schmidt, Cologne (DE); Heiko Wuestner, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/072,057

(22) Filed: Mar. 16, 2016

(65) Prior Publication Data

US 2016/0272247 A1    Sep. 22, 2016

(30) Foreign Application Priority Data

Mar. 19, 2015    (DE) .................. 10 2015 204 963

(51) Int. Cl.
*B62D 21/15*    (2006.01)
*B62D 25/08*    (2006.01)

(52) U.S. Cl.
CPC ......... *B62D 21/152* (2013.01); *B62D 25/082* (2013.01)

(58) Field of Classification Search
CPC ............................ B62D 21/152; B62D 25/082
USPC .......................................... 296/203.02, 187.1
See application file for complete search history.

(56) References Cited

U.S. PATENT DOCUMENTS

| | | | | |
|---|---|---|---|---|
| 5,031,958 A * | 7/1991 | Fujita | ............. | B62D 25/088 180/89.1 |
| 6,412,857 B2 * | 7/2002 | Jaekel | ............. | B62D 23/005 296/203.04 |
| 7,887,122 B2 * | 2/2011 | Baccouche | ............. | B62D 21/152 296/187.09 |
| 9,573,628 B2 * | 2/2017 | Mildner | ............. | B62D 25/082 |
| 9,650,073 B2 * | 5/2017 | Kim | ............. | B62D 25/082 |

FOREIGN PATENT DOCUMENTS

| | | |
|---|---|---|
| DE | 102006009290 A1 | 9/2007 |
| DE | 102007018474 A1 | 11/2008 |
| EP | 0810144 A1 | 12/1997 |

* cited by examiner

*Primary Examiner* — Jason S Morrow
*Assistant Examiner* — E Turner Hicks
(74) *Attorney, Agent, or Firm* — Frank A. MacKenzie; Brooks Kushman P.C.

(57) ABSTRACT

A motor vehicle front end crash-load carrying structure has at least one side rail on each side of the vehicle extending in the vehicle longitudinal direction, an A-pillar extending upward from the side rail, and a reinforcement extending between the A-pillar and the side rail. The reinforcement is made up of a longitudinally-extending rear element fixed to the A-pillar and extending forward therefrom outboard of the side rail, and a transversely-extending forward element fixed to and extending inboard from a forward end of the rear element, an inboard end of the forward element abutting an outboard surface of the side rail. The rear element extends substantially parallel with a vehicle longitudinal axis and defines a concave-downward wheel arch. The rear element may include an engineered bending site adjacent to a joint between the rear element and the forward element. The reinforcement may be supported on a suspension mount.

18 Claims, 7 Drawing Sheets

FRONT END OF A MOTOR VEHICLE

CROSS-REFERENCE TO RELATED APPLICATIONS

This application claims foreign priority benefits under 35 U.S.C. § 119(a)-(d) to DE 10 2015 204 963.9 filed Mar. 19, 2015, which is hereby incorporated by reference in its entirety.

TECHNICAL FIELD

The present invention relates to a front end structure of a motor vehicle.

BACKGROUND

In a frontal impact of a motor vehicle the impact energy is absorbed and reduced mainly by the front end. However, in cases where an overlapping contact between the vehicle and the other party to the collision is less than approximately 25% of the total width of the vehicle body, which is referred to here as a highly offset frontal impact, a significant portion of the vehicle structure designed and otherwise able to reduce the impact may not effectively contribute to energy absorption. "Highly offset" collisions are alternatively referred to as "small overlap" collisions.

The following prior art references disclose various possible ways of reinforcing the vehicle front end: U.S. Pat. No. 5,031,958; DE 102007018474A1; EP 0810144B1; and DE 102006009290B4.

SUMMARY

According to a disclosed embodiment, a front end of a motor vehicle comprises at least one side rail on each side of the vehicle extending in the vehicle longitudinal direction, to which a load-bearing A-pillar is fixed. The A-pillar extends from a floor area of the vehicle to a roof area of the vehicle and comprises a lower portion on the floor area side and an upper portion which lies contiguously with this in the direction of the roof area and which is angled rearward in relation to the lower portion, as is well known in the art. The front end structure further comprises a reinforcement, its rear end fixed to an upper end of the lower portion of the A-pillar above the side rail, and its forward end fixed to the side rail, and which extends between these two fixing sites at a lateral distance outside the side rail and above the side rail. The reinforcement is attached laterally to the outside/outboard surface of the side rail. In other words, the reinforcement is attached to an outside of the side rail remote from the vehicle central longitudinal plane. Positional terms used herein, such as "in front", "behind", "above", "below", "laterally outside" and the like always refer to a state of the front end when fitted to the vehicle.

The disclosed front end structure effectively prevents the A-pillar of the vehicle being forced rearward and/or laterally inward (into the passenger compartment) in the event of a frontal impact, and particularly in a highly offset frontal impact. In addition, it also improves the lateral rigidity of the front end, in order to allow the other party to the collision to glance off the side of the vehicle, particularly in the event of a highly offset frontal impact. The structure does not diminish the capacity for softening an impact in the event of a head-on or virtually head-on impact.

The reinforcement provides an additional upper, lateral load path, which lies outside/outboard of the side rail and absorbs energy in the event of highly offset collisions. In the event of a highly offset, collision energy is introduced into the front end structure/frame of the motor vehicle at an early stage. Having the reinforcement bear directly against the outboard surface of the side rail leads to a significant increase in the lateral rigidity of the front end of the motor vehicle.

In particular, in the event of a highly offset collision the reinforcement is deformed and is pressed, at least in parts, against the outside of the side rail, primarily in the area around the site where the reinforcement is fixed to the side rail, which forms a protective structure and allows the other party to the collision to glance off to the side of the front end of the motor vehicle.

As has been explained above, the A-pillar, more specifically the upper end of the lower portion of the A-pillar, is connected to the side rail by the reinforcement. In the event of a highly offset collision, the reinforcement acts as a limiting strap and prevents the upper end of the lower portion of the A-pillar giving way in the event of an overload. In other words, by providing a direct connection of the A-pillar to the side rail (and hence to the front end of the motor vehicle), the reinforcement serves to transfer a portion of the load into the side rail in the event of a compressive load acting on the A-pillar.

According to a feature of the disclosed embodiment, the reinforcement is attached to a front end portion of the side rail laterally outside the side rail, preferably in the area immediately behind a bumper beam of the motor vehicle, which is attached to the front end of the side rail. In the event of a highly offset collision this allows energy to be introduced substantially into the entire front end of the motor vehicle, which is thereby effectively involved, substantially in its entirety, in reducing the energy.

According to another feature of the disclosed embodiment, the reinforcement is of arched design. In other words, the reinforcement bridges both the vertical distance and the lateral distance between the two fixing sites of the reinforcement on the A-pillar and on the side rail in the manner of a curved arch. The arched shape affords substantial advantages in obtaining a high rigidity of the reinforcement. In addition, the reinforcement can also be made to conform to the shape of a wheel arch, which encloses the reinforcement substantially between the A-pillar and the side rail.

According to yet another feature of the disclosed embodiment, the reinforcement comprises a downward-arched, rigid rear element extending longitudinally, which is fixed to the A-pillar, and a rigid forward element extending transversely and which bridges the lateral distance between the rear element and the side rail and by means of which the reinforcement is attached laterally to the outside of the side rail. The rear element and the forward element are connected to one another at a joining site.

At least one predefined bending site is preferably provided in the area of the joining site between the rear element and the forward element. This is an advantageous way of ensuring that the reinforcement is not in full contact in the event of a head-on or virtually head-on impact. In particular, the rear element and the forward element are in this case capable of flexing at the joining site and moving against one another, so that the mechanics of the side rail are not disrupted.

To increase the rigidity of the forward element, in a further feature of the disclosed embodiment, the forward element comprises a lower, cupped section and a closing plate closing the open upper side of the cupped section. The resulting forward element accordingly has a stable, closed cross section.

According to a further feature of the disclosed embodiment, a further increase in the rigidity of the forward element is obtained in that the closing plate is supported on the side rail, in particular on its outside/outboard surface.

In addition, in a further feature of the disclosed embodiment, the arched rear element comprises an outer U-shaped section and an inner flat section closing the open side of the U-section. Accordingly, the rear element also has a closed, resistant cross section.

According to a further feature of the disclosed embodiment, the flat section of the rear element is supported on a suspension strut mounting of the motor vehicle, thereby increasing the resistance of the rear element in a lateral direction yet further. In particular, in the event of a highly offset collision the reinforcement is pressed under its own deformation protectively against the side rail and the suspension strut mounting and thus allows the other party to the collision to glance off.

Further features and advantages of the invention ensue from the following description of a non-limiting exemplary embodiment of the invention, which is explained in more detail below with reference to the drawing, in which schematic drawing:

DETAILED DESCRIPTION

Figure 1:
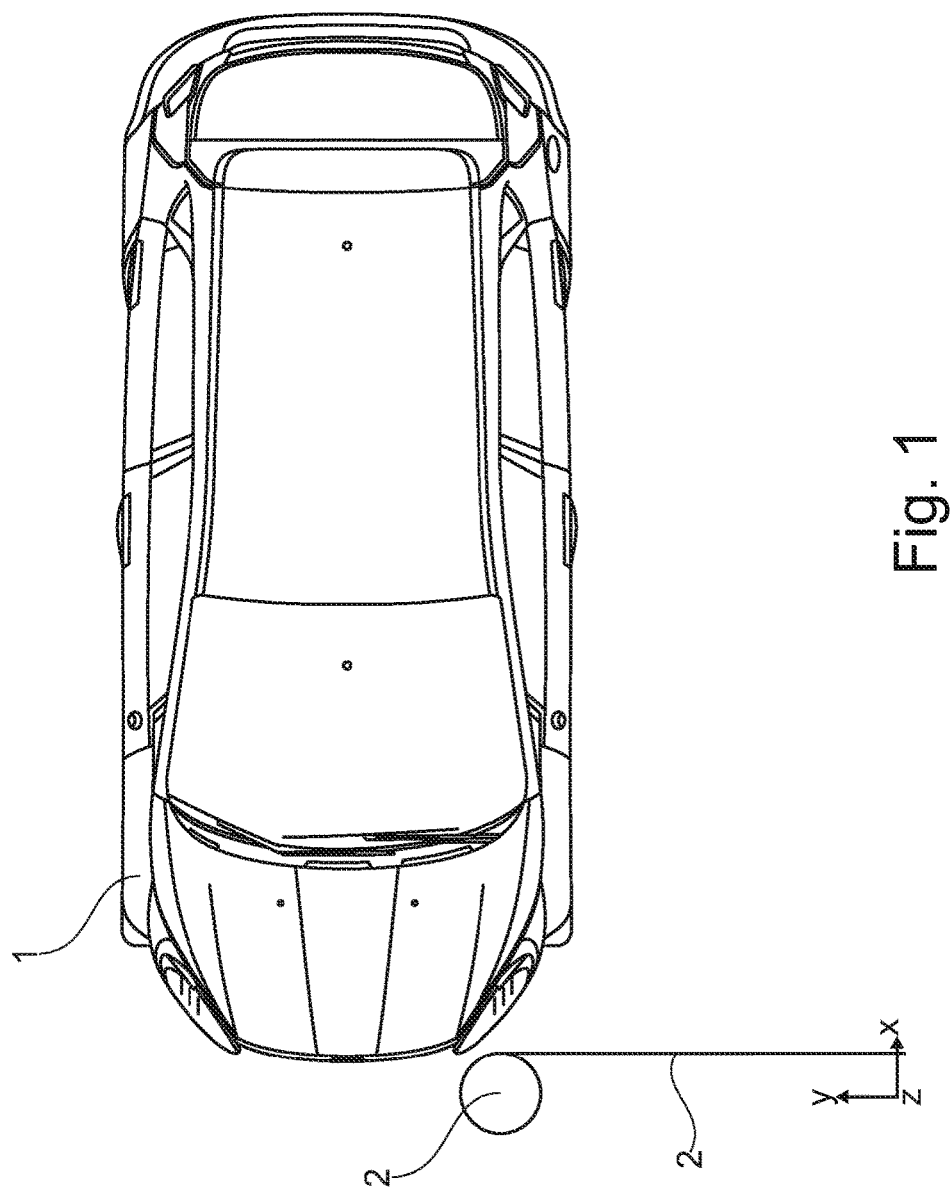
FIG. 1 shows a highly offset frontal impact situation between a motor vehicle and another party to the collision.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various figures parts serving an equivalent function are always provided with the same reference numerals, so that as a rule these are also only described once.

The front end of a motor vehicle according to the invention is explained here below, taking the configuration of a left-hand vehicle side as an example. It should be understood, however, that because of the substantially symmetrical configuration of the front end, for the purposes of the invention these explanations also apply equally to the right-hand vehicle side.

FIG. 1 represents a highly offset (small overlap) frontal impact situation between a motor vehicle 1 and another party to the collision 2. It can be seen that the other party to the collision 2 has an overlapping contact with the total width of the motor vehicle 1 of approximately 25% or less.

Figure 2:
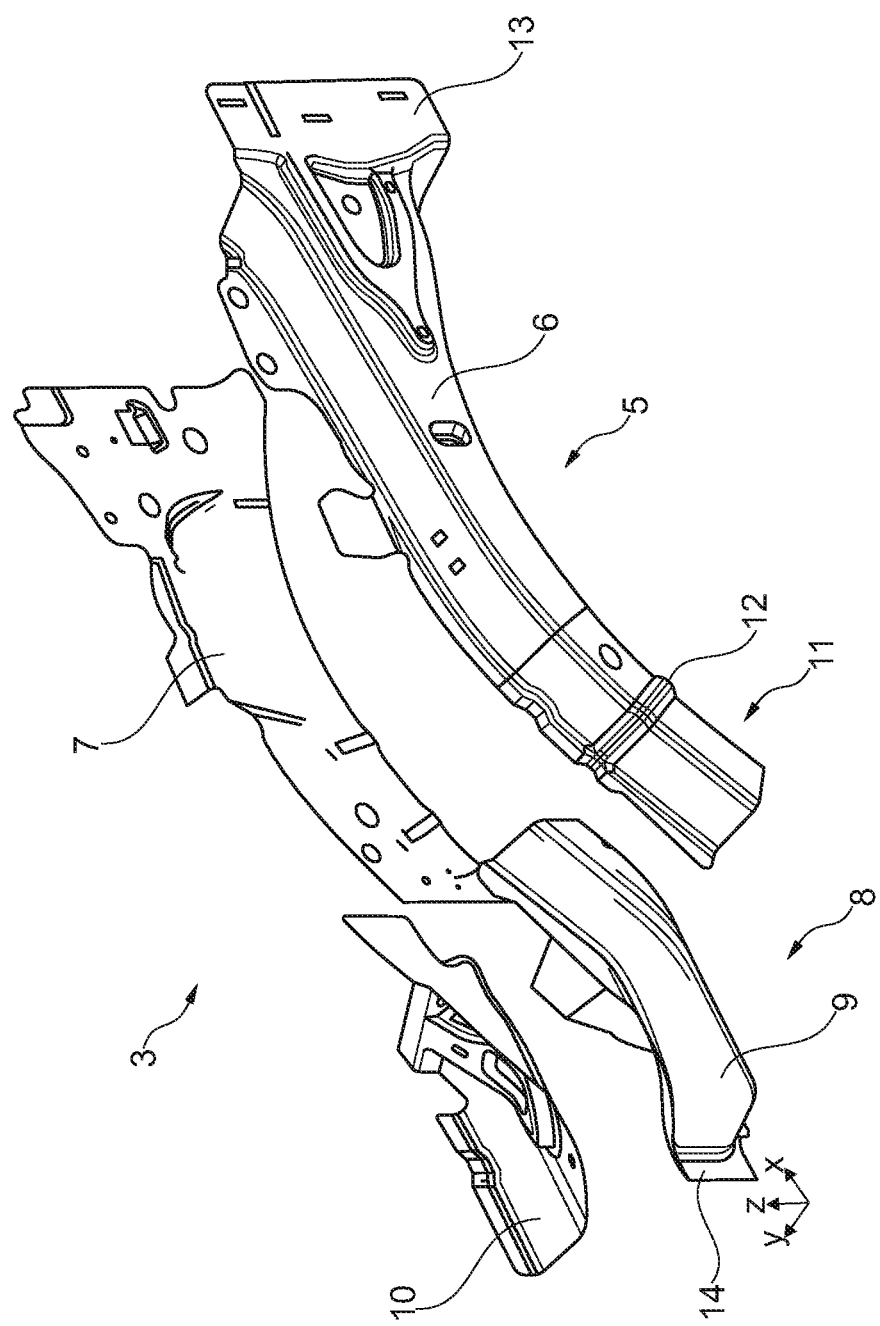
FIG. 2 shows a perspective, exploded view of a reinforcement in an exemplary embodiment of an inventive front end of a motor.
Figure 3:
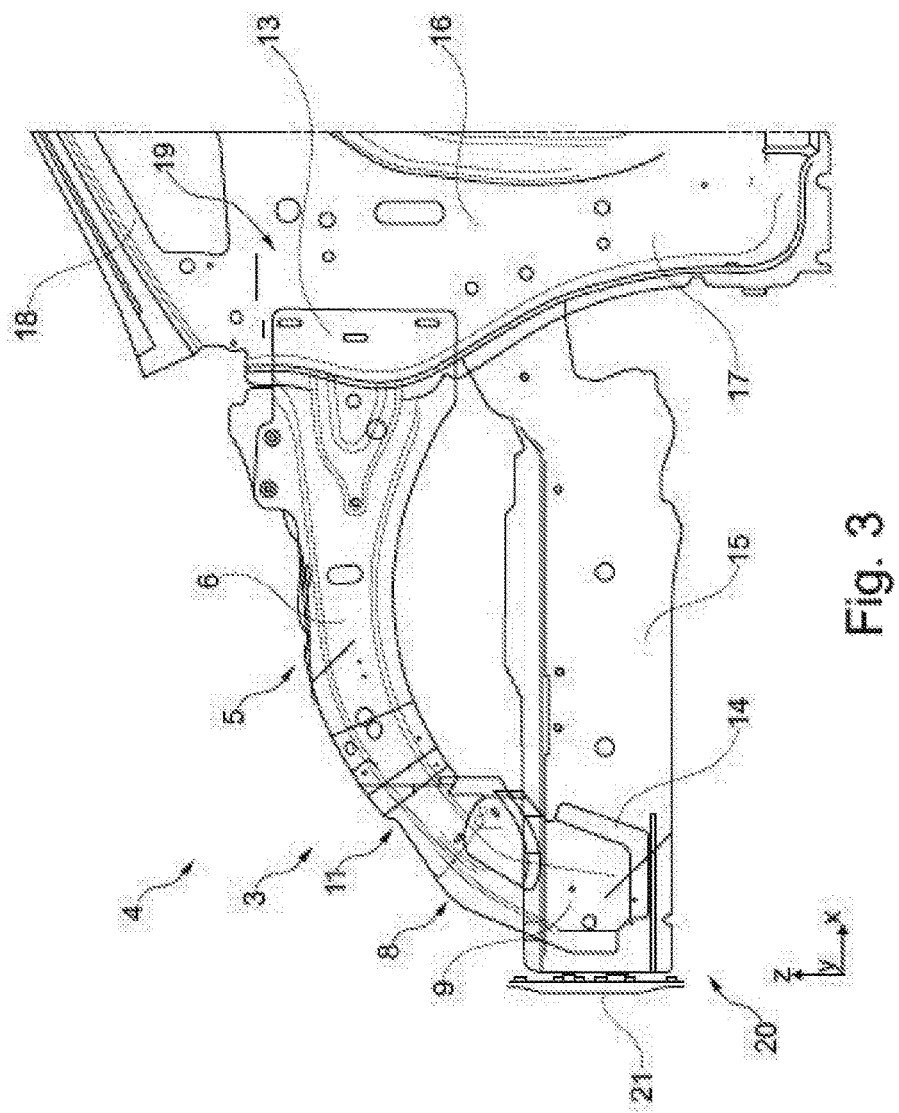
FIG. 3 shows an external side view of a left-hand side of the motor vehicle in FIG. 1 having a front end comprising the reinforcement in FIG. 2.
Figure 4:
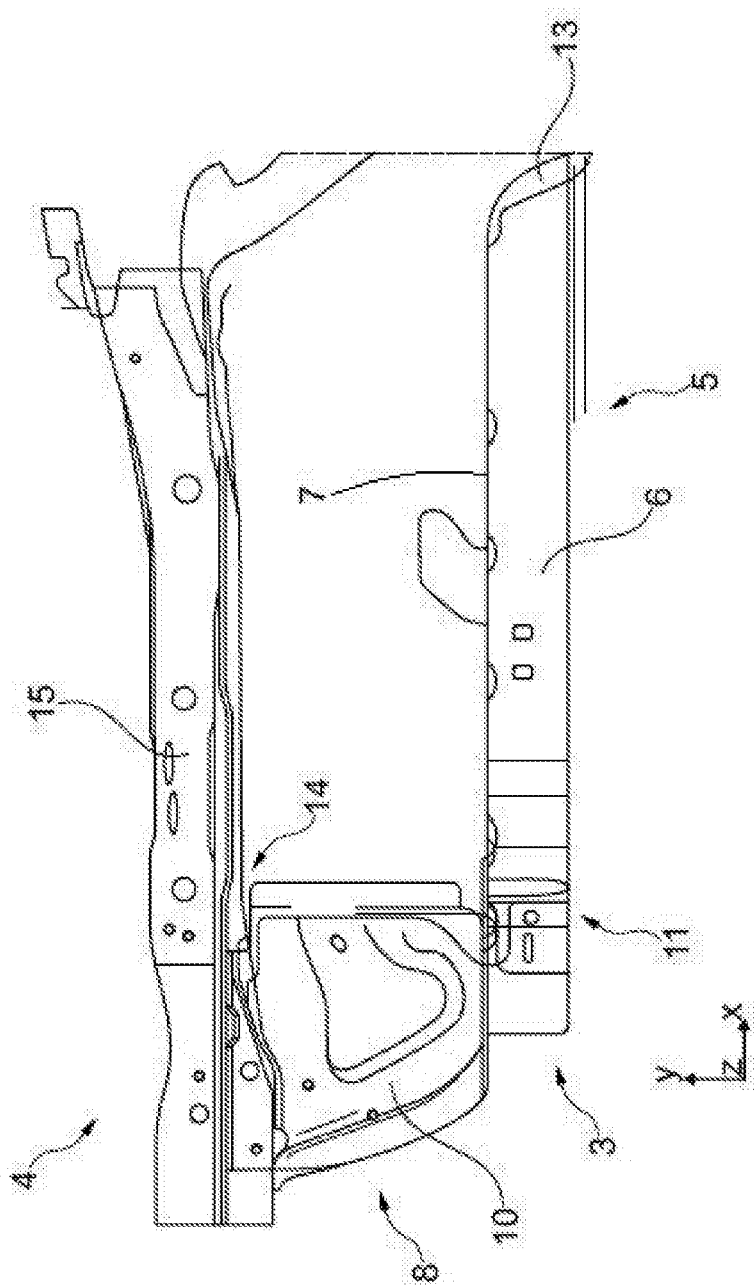
FIG. 4 shows a top view of the left-hand vehicle side of the front end in FIG. 3.

FIG. 2 is a perspective, exploded view of a reinforcement 3 of an exemplary embodiment of a front end 4 of the motor vehicle 1 in FIG. 1, shown in FIGS. 3 and 4. FIG. 3 shows the front end 4 in an external side view of the left-hand vehicle side of the motor vehicle 1 represented in FIG. 1. FIG. 4 represents a top view of the left-hand vehicle side of the front end 4 in FIG. 3.

It can be seen in FIG. 2 that in the exemplary embodiment represented the reinforcement 3 is substantially composed of four parts: an arched rear element 5, which in turn comprises an outer U-shaped section 6 and an inner flat section 7 closing the open side of the U-section, and a likewise arched forward element 8, which comprises a lower cupped section 9 and a closing plate 10 closing the open upper side of the cupped section 9. In the exemplary embodiment represented the rear element 5 and the forward element 8 accordingly each form a closed cross section.

In the assembled state the rear element 5 and the forward element 8 are connected to one another at a joining site 11. FIG. 2 shows an engineered bending site 12, for example in the form of a swage line, in the area of the joining site 11. The reinforcement 3 is designed to bend at the engineered bending site 12 in the event of a head-on or virtually head-on impact, so that the forward element 8 and the rear element 5 are able to bend and move against relative to one another.

At the rear end of the reinforcement 3, the rear element 5 comprises a fixing portion 13, which is configured to be connected to an A-pillar 16 (as shown in FIG. 3) of the motor vehicle 1. Fixing portion 13 may take the form of a flange, as is visible in FIG. 2. At the forward end of the reinforcement 3, the forward element 8 comprises a fixing portion 14, which is configured to abut and be connected to a side rail 15 (as shown in FIG. 3) of the motor vehicle 1, in particular to the outboard surface thereof. Fixing portion 14 may comprise one or more flanges the bear against the outboard surface of the side rail 15. The flanges may be fixed to the side rail 15 by any appropriate means, such as by adhesive, welding, bolting, and/or riveting.

As can be seen from FIG. 2, the concave-down arched shape of the rear element 5 is substantially formed in the vehicle Z-direction, in order to bridge the vertical distance between the rear fixing portion 13 and the forward fixing portion 14. The arched shape of the forward element 8 is substantially formed in the vehicle Y-direction, in order to bridge the lateral distance between the rear fixing portion 13 and the forward fixing portion 14.

FIG. 3 represents an external side view of a left-hand vehicle side of an exemplary embodiment of a front end 4 according to the invention, and FIG. 4 represents a top view of the left-hand vehicle side of the front end 4 in FIG. 3.

As can be seen from FIGS. 3 and 4, the left-hand vehicle side of the front end structure 4 shown comprises a side rail 15 extending in the vehicle longitudinal direction X. A load-bearing A-pillar 16 extends from a lower portion of the vehicle body structure (adjacent to a cabin floor) to an upper portion of the vehicle body structure (adjacent to a roof of the vehicle). As can be seen in FIG. 3, the A-pillar 16 is fixed to the side rail 15, for example by a welded, riveted, and/or bolted connection as is well known in the art. The A-pillar 16 comprises a lower portion 17 adjacent to the lower or floor area of the vehicle body and extending substantially vertically (along the vehicle Z-axis), and an upper portion 18, which is integral/contiguous with the lower portion 17 and which extends at an angle upward and to the rear in relation to the lower portion 17.

Also visible in FIGS. 3 and 4 is the reinforcement 3 substantially comprising the rear element 5 and the forward element 8. The rear end of reinforcement 3, in particular the rear fixing portion 13 of the rear element 5, is fixed to the A-pillar 16 at a point adjacent to an upper end 19 of the lower portion 17, and above the side rail 15. The forward end of the reinforcement 3, in particular the forward fixing portion 14 of the forward element 8, is fixed to the side rail 15. In the side view of the front end 4 represented in FIG. 3 it can be seen how the reinforcement 3 extends between the two fixing sites 13 and 14 in an arched shape above the side rail 15. It can be seen in the top view of the front end 4 represented in FIG. 4, how the reinforcement 3 extends between the two fixing sites 13 and 14 at a lateral distance outside the side rail 15. It can be seen from both FIGS. 3 and 4 that the reinforcement 3, in particular the forward fixing portion 14 of the forward element 8, is attached laterally to the outside or outboard surface of the side rail 15.

Furthermore, it can clearly be seen in FIG. 3 that, in the exemplary embodiment of the front end 4 shown, the reinforcement 3, in particular the forward fixing portion 14 of the forward element 8, is attached to a front end portion 20 of the side rail 15 laterally outside the side rail 15. In particular, it can be seen from FIG. 3 that the fixing portion 14 of the forward element 8 is attached to the side rail 15 directly behind a crash load-carrying element functioning as a bumper beam 21. This allows energy to be introduced into substantially the entire front end structure 4 of the motor vehicle in the event of a highly offset collision, so that substantially the entire structure of the front end 4 can be used to reduce the energy.

It can clearly be seen in the side view represented in FIG. 3 that the reinforcement 3, in particular the rear element 5, is of arched design in the Z-direction. The arched design of the reinforcement 3, particularly of the forward element (8), in the Y-direction can clearly be seen in the top view represented in FIG. 4. This affords a high rigidity of the reinforcement 3 in all spatial directions.

Figure 5:
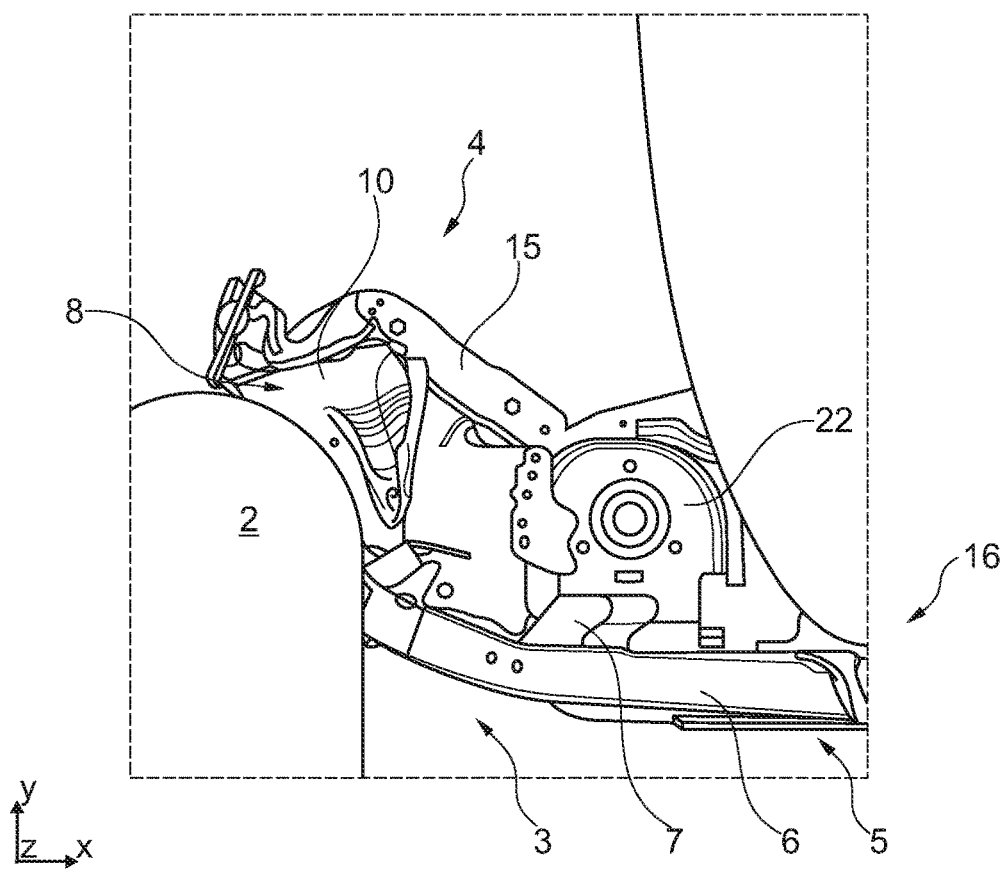
FIG. 5 shows a first top view of the left-hand vehicle side of the front end in FIG. 3 shortly after a highly offset frontal impact with another party to the collision.
Figure 6:
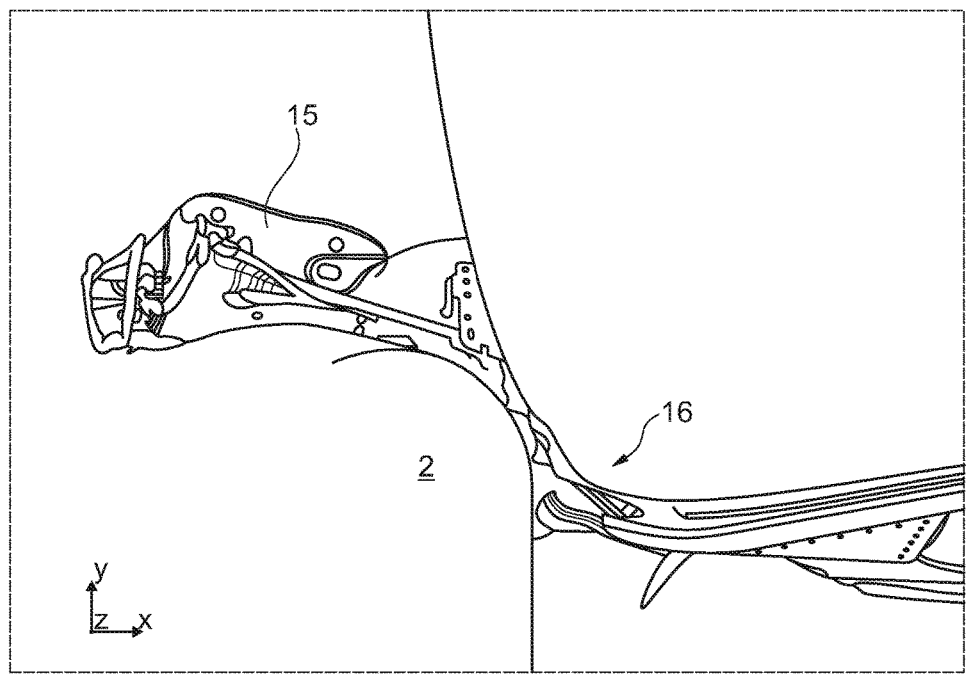
FIG. 6 shows a second top view of the left-hand vehicle side of the front end in FIG. 3 in a later state following the highly offset frontal impact with another party to the collision.
Figure 7:
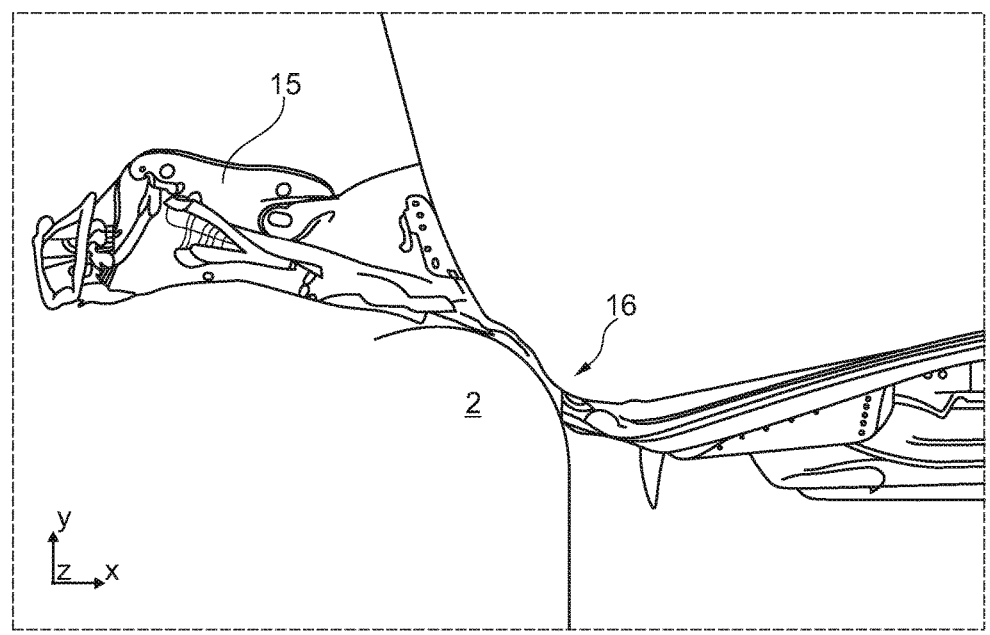
FIG. 7 a third top view of the left-hand vehicle side of the front end in FIG. 3 at the end of the highly offset frontal impact with another party to the collision.

FIGS. 5, 6 and 7 each represent a top view of the left-hand vehicle side of the front end 4 in FIGS. 3 and 4 in a highly offset frontal impact sequence with another party to the collision 2. FIG. 5 shows the state shortly after the beginning of the frontal impact, FIG. 6 a later state of the frontal impact, and FIG. 7 the final state after the frontal impact.

It can be seen in FIG. 5 that the rear element 5 of the reinforcement 3, in particular a portion of the flat section 7, is supported on a suspension strut mounting 22, in order to afford an even greater resistance of the reinforcement 3 in the Y-direction.

In the impact state represented in FIG. 5 the forward element 8 of the reinforcement 3 is pressed against the outboard side of the side rail 15. In FIG. 6 the entire reinforcement 3 has already been pressed against both the outboard side of the side rail 15 and the outboard side of the suspension strut mounting 22. As has already been described, the reinforcement 3 forms a limiting strap between the A-pillar 16 and the side rail 15, so that this prevents the A-pillar 16 giving way in the event of an overload, as may occur in the event of a highly offset frontal impact represented in FIGS. 5, 6, and 7. This state can be seen in FIG. 7, in which the A-pillar 16 is not substantially forced in rearwards by the other party to the collision 2. The direct connection of the A-pillar 16 to the side rail 15 by way of the reinforcement 3 means that in the event of a rearward-directed load acting on the A-pillar 16 a portion of that load is introduced into the side rail 15 to thereby restrain the A-pillar 16 against rearward and/or inward deformation. In addition, the reinforcement 3 acting as a limiting strap is also effective in a lateral direction, in that the reinforcement 3 pressed against the side rail 15 and the suspension strut mounting 22 causes the other party to the collision 2 to glance off to the outboard side (the left side in the current example) of the vehicle.

The front end according to the invention has been explained in more detail with reference to an exemplary embodiment represented in the figures. However, the front end is not limited to the embodiment described herein, but rather also includes similarly acting embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle front end structure comprising:
   a longitudinally extending side rail;
   an A-pillar extending upward from the side rail; and
   a reinforcement comprising
      a longitudinally extending rear element, fixed to the A-pillar and extending forward therefrom outboard the side rail, and including an engineered bending site configured to promote bending thereat during impact, and
      a transversely-extending forward element fixed to and extending inboard from a forward end of the rear element, and including an inboard end abutting an outboard surface of the side rail.

2. The front end structure of claim 1, wherein the rear element has a concave-downward shape defining a wheel arch.

3. The front end structure of claim 1, wherein the engineered bending site is adjacent a joint between the forward and rear elements.

4. The front end structure of claim 3, wherein the joint comprises an overlap between the forward and rear elements, and the engineered bending site is immediately adjacent the overlap.

5. The front end structure of claim 1, wherein the forward element is fixed to the side rail immediately rearward of a bumper beam supported by the side rail.

6. The front end structure of claim 1, wherein at least one of the forward and rear elements is supported on a suspension mount outboard of the side rail.

7. A vehicle front end comprising:
   a longitudinally extending side rail;
   an A-pillar extending fixed to the side rail;
   a rear element fixed to and extending forward the A-pillar outboard the side rail; and
   a forward element fixed to the rear element, including an inboard end fixed outboard the side rail, the rear element including an engineered bending site adjacent a joint between the forward and rear elements configured to promote bending thereat during impact.

8. The front end of claim 7, wherein the rear element extends substantially parallel with a vehicle longitudinal axis.

9. The front end of claim 7, wherein the rear element defines a concave-downward wheel arch.

10. The front end of claim 7, wherein the engineered bending site is a swage line.

11. The front end of claim 10, wherein the joint comprises an overlap between the forward and rear elements, and the swage line is immediately adjacent the overlap.

12. The front end of claim 7, wherein the forward element is fixed to the side rail immediately rearward of a bumper beam supported by the side rail.

13. The front end of claim 7, wherein at least one of the forward and rear elements is supported on a suspension mount outboard of the side rail.

14. A vehicle front end structure comprising:
a longitudinally extending side rail;
an A-pillar extending upward from the side rail; and
a reinforcement comprising
  a longitudinally extending element, fixed to and extending forward from the A-pillar outboard of and above the side rail to define a concave-downward wheel arch, and including an engineered bending site configured to promote bending thereat during impact, and
  a forward element, bridging a lateral distance between the rear element and the side rail, and including an inboard end abutting and fixed to an outboard surface of the side rail.

15. The front end structure of claim 14, wherein the engineered bending site is adjacent a joint between the forward and rear elements.

16. The front end structure of claim 15, wherein the joint comprises an overlap between the forward and rear elements, and the engineered bending site is immediately adjacent the overlap.

17. The front end structure of claim 14, wherein the forward element is fixed to the side rail immediately rearward of a bumper beam supported by the side rail.

18. The front end structure of claim 14, wherein at least one of the forward and rear elements is supported on a suspension mount outboard of the side rail.

* * * * *